(12) United States Patent
Seleznev et al.

(10) Patent No.: US 7,363,160 B2
(45) Date of Patent: Apr. 22, 2008

(54) TECHNIQUE FOR DETERMINING PROPERTIES OF EARTH FORMATIONS USING DIELECTRIC PERMITTIVITY MEASUREMENTS

(75) Inventors: Nikita Seleznev, Ridgefield, CT (US); Tarek Habashy, Danbury, CT (US); Austin Boyd, Ridgefield, CT (US); Mehdi Hizem, Paris (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 9 days.

(21) Appl. No.: 11/233,680

(22) Filed: Sep. 23, 2005

(65) Prior Publication Data

US 2007/0061082 A1 Mar. 15, 2007

Related U.S. Application Data

(60) Provisional application No. 60/716,254, filed on Sep. 12, 2005, provisional application No. 60/716,253, filed on Sep. 12, 2005.

(51) Int. Cl.
*G01V 3/18* (2006.01)
(52) U.S. Cl. .......................................... 702/7; 702/13
(58) Field of Classification Search .................. 702/7, 702/10, 11, 12, 13
See application file for complete search history.

(56) References Cited

U.S. PATENT DOCUMENTS

| | | | |
|---|---|---|---|
| 3,849,721 A | 11/1974 | Calvert ........................... 324/6 |
| 3,891,916 A * | 6/1975 | Meador et al. ............. 324/341 |
| 3,893,020 A * | 7/1975 | Meador et al. ............. 324/341 |
| 3,893,021 A * | 7/1975 | Meador et al. ............. 324/341 |
| 3,944,910 A | 3/1976 | Rau ............................ 324/338 |
| 4,626,773 A | 12/1986 | Kroeger et al. ............. 324/642 |
| 4,703,277 A * | 10/1987 | Kenyon et al. ............. 324/323 |
| 4,704,581 A | 11/1987 | Clark .......................... 324/341 |
| 5,059,907 A | 10/1991 | Sherman ..................... 324/323 |
| 5,243,290 A | 9/1993 | Safinya et al. .............. 324/338 |
| 5,345,179 A | 9/1994 | Habashy et al. ............. 324/338 |
| 5,434,507 A | 7/1995 | Beren et al. ................. 324/338 |
| 5,811,973 A | 9/1998 | Meyer, Jr. .................... 324/338 |
| 6,218,841 B1 * | 4/2001 | Wu ............................. 324/338 |
| 2003/0011386 A1 | 1/2003 | Xie et al. .................... 324/694 |

FOREIGN PATENT DOCUMENTS

| | | |
|---|---|---|
| EP | 0 516 525 A | 2/1992 |
| EP | 0 572 309 A | 1/1993 |
| EP | 1 693 685 A1 | 8/2006 |
| GB | 1 597 321 | 3/1981 |
| GB | 2 322 200 A | 8/1998 |

OTHER PUBLICATIONS

Archie, G.E. "Electrical Resistivity an Aid in Core-Analysis Interpretation." *Bullet. Of Amer. Assoc. of Petroleum Geolog.* vol. 31, No. 2 (1947): pp. 350-366.

(Continued)

*Primary Examiner*—Donald E McElheny, Jr.
(74) *Attorney, Agent, or Firm*—Martin M. Novack; Vincent Loccisano; Jody Lynn DeStefanis

(57) ABSTRACT

Techniques for determining formation characteristics use measurements of dielectric permittivity at a number of frequencies. Determined characteristics include the vertical and horizontal formation dielectric constant and conductivity, the formation water conductivity, the water saturation, the cementation and the saturation exponents. In laminated formations these profiles can be determined for each lamina. Also, formation dielectric properties are used in determination of the rock type.

30 Claims, 13 Drawing Sheets

OTHER PUBLICATIONS

Calvert, T.J., Rau, R.N., and Wells, L.E. "Electromagnetic Propagation, A New Dimension in Logging." *SPE* 6542, 1977.

Cheruvier, E., Suau, J. "Applications of Micro-wave Dielectric Measurements in Various Logging Environments." SPWLA 27th Annual Logging Symposium. (Jun. 9-13, 1986).

Desai, K.P. and Moore, E.J. "Equivalent NaCl Determination from Ionic Concentrations." *The Log Analyst*. (May/Jun. 1969): pp. 12-21.

Klein, L.A. and Swift, C.T. "An Improved Model for the Dielectric Constant of Sea Water at Microwave Frequencies." *IEEE Trans.: On Antennas and Propagation*. vol. AP-25, No. 1, (1977): pp. 104-111.

Landau, L.D., and Lifshitz, E.M. *Electrodynamics of continuous media*. London: Pergamon, 1960: pp. 26-27.

Ramakrishnan, T.S., and Wilkinson, D.J. "Water Cut and Fractional Flow Logs from Array Induction Measurements", *SPE* paper 36503, (1996).

Seleznev, N., Boyd, A., Habashy, T., Luthi, S. "Dielectric mixing laws for fully and partially saturated carbonate rocks." Proceedings of the SPWLA 45th Annual Logging Symposium, Jun. 6-9, 2004, The Netherlands.

Taherian, M.R., Yuen, D.J., Habashy, T.M., and Kong, J. "A Coaxial-Circular Waveguide for Dielectric Measurement." *IEEE Trans. Geoscience and Remote Sensing*. vol. 29, No. 2 (Mar. 1991): pp. 321-330.

\* cited by examiner

TABLE 1

| ROCK TYPE | LOW DISPERSIVE | AVERAGE DISPERSION | HIGHLY DISPERSIVE | VERY HIGHLY DISPERSIVE |
|---|---|---|---|---|
| CORALLINE BOUNDSTONES | | | | X |
| POROUS GRAINSTONES WITH SIGNIFICANT DISSOLUTION; INTERPARTICLE AND INTRAPARTICLE POROSITY | | | X | |
| MIXED LIMESTONE ROCK TYPE | | X | | |
| GRAINSTONES WITH SOLID ROUND GRAINS AND PREDOMINANT INTERPARTICLE POROSITY | X | | | |
| OOMOLDIC LIMESTONES | X | | | |
| CRYSTALLINE DOLOMITES | X | | | |

FIG.9

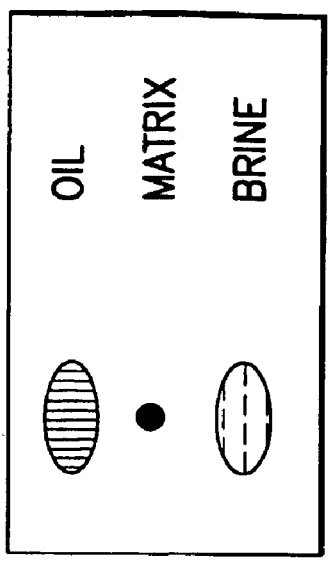
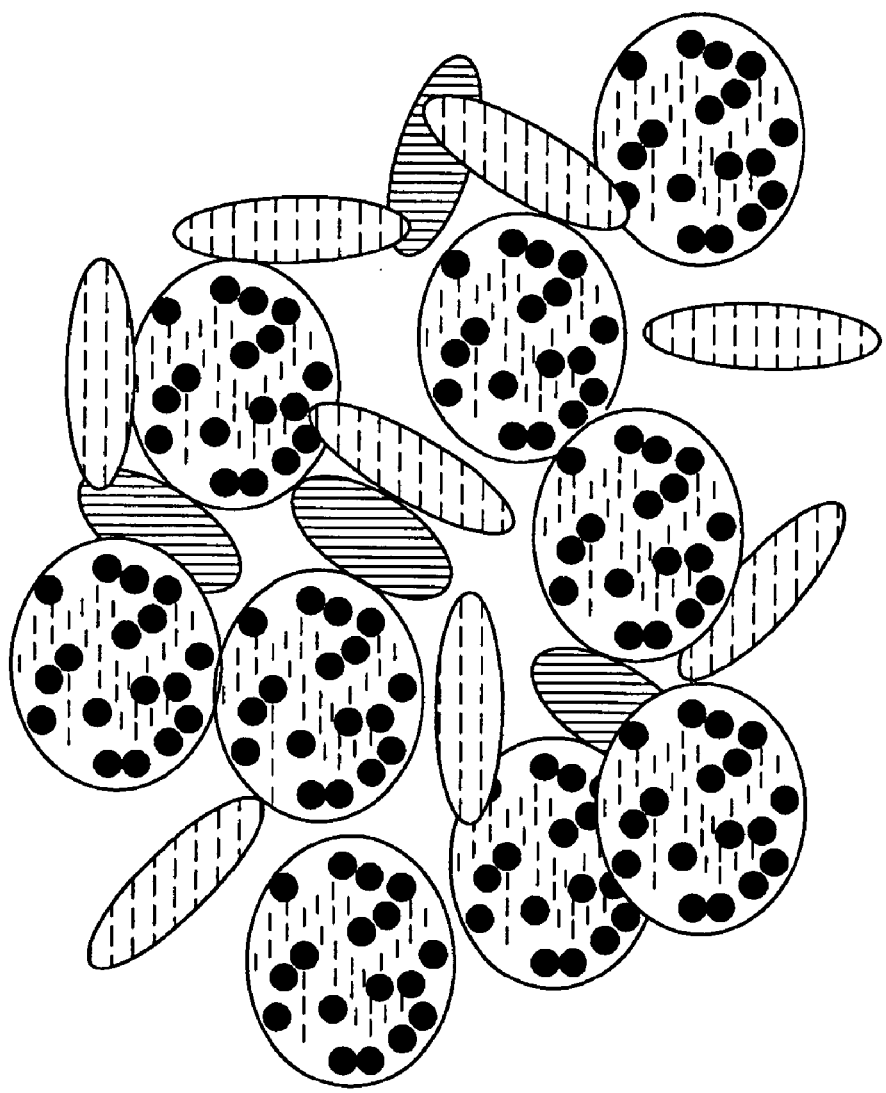
FIG. 10

TECHNIQUE FOR DETERMINING PROPERTIES OF EARTH FORMATIONS USING DIELECTRIC PERMITTIVITY MEASUREMENTS

RELATED APPLICATION

This application claims benefits of priority from the following:

i) U.S. Provisional Patent Application Ser. No. 60/716,254, entitled "TECHNIQUE FOR DETERMINING PROPERTIES OF EARTH FORMATIONS USING DIELECTRIC PERMITTIVITY MEASUREMENTS," invented by Nikita SELEZNEV, Tarek HABASHY, Austin BOYD and Mehdi HIZEM, as filed on Sep. 12, 2005.

ii) U.S. Provisional Patent Application Ser. No. 60/716,253, entitled "METHOD FOR DETERMINING PROPERTIES OF EARTH FORMATIONS USING DIELECTRIC PERMITTIVITY MEASUREMENTS," invented by Tarek HABASHY, Nikita SELEZNEV, Austin BOYD and Mehdi HIZEM, as filed on Sep. 12, 2005.

The subject matter of the present Application is related to subject matter disclosed in copending U.S. patent application Ser. No. 11/233,718, entitled "METHOD FOR DETERMINING PROPERTIES OF EARTH FORMATIONS USING DIELECTRIC PERMITTIVITY MEASUREMENTS," filed of even date herewith, and assigned to the same assignee as the present Applicant.

FIELD OF THE INVENTION

This invention relates to the field of well logging to determine characteristics of formations surrounding an earth borehole and, more particularly, to methods for determining earth formation characteristics using dielectric permittivity measurements.

BACKGROUND OF THE INVENTION

In order to produce hydrocarbons economically, a reasonably accurate estimation of hydrocarbon volume and moveability has to be performed. The conventional resistivity interpretation method becomes unreliable if the formation water resistivity is unknown or if it is very high. Additionally, the formation factor and the cementation exponent of the formations can vary with depth, resulting in an inaccurate water saturation evaluation.

The measurement of dielectric constant (or dielectric permittivity) of formations surrounding a borehole is known to provide useful information about the formations. The dielectric constant of the different materials of earth formations vary widely (for example, roughly 2.2 for oil, 7.5 for limestone, and 80 for water), so measurement of dielectric properties can be a useful means of formation evaluation. Logging tools for this purpose have been proposed and/or developed over the years.

A logging device which measures formation dielectric constant is disclosed in the U.S. Pat. No. 3,944,910. The logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations, can then be obtained from the phase and attenuation measurements. Measurements are typically, although not necessarily, made on the formation invaded zone. Two transmitters are generally used in a borehole compensated array to minimize the effect of borehole rugosity, tool tilt, and dissimilarities in the transmitters, receivers, and their circuits. (See, for example, U.S. Pat. No. 3,849,721.)

The antennas shown in U.S. Pat. No. 3,944,910 are slot antennas, each having a probe that extends across the slot in a direction parallel to the longitudinal direction of the borehole. This configuration has become known as a "broadside" array. The U.S. Pat. No. 4,704,581 describes a logging device of similar type, but wherein the slot antennas have probes that extend in a direction perpendicular to the longitudinal direction of the borehole. This configuration has become known as an "endfire" array. These two different configurations have orthogonal magnetic moments and some other differences. The endfire array exhibits a deeper depth of investigation and is less affected by tool standoff (e.g. from mudcake or poor pad contact) than the broadside array. On the other hand, the broadside array exhibits a stronger signal characteristic than the endfire array.

A logging device which utilizes teachings of the above-referenced U.S. Pat. Nos. 3,944,910 and 4,704,581 is the electromagnetic propagation tool ("EPT"—mark of Schlumberger). A so-called adaptable EPT ("ADEPT—mark of Schlumberger") can provide either broadside operation or endfire operation during a given logging run, depending on conditions. The ADEPT logging tool has two changeable pads, one containing a broadside antenna array and the other an endfire antenna array.

In the U.S. Pat. No. 5,434,507 there is disclosed a logging device that includes a two-dimensional array of slot antennas which can provide two-dimensional quantitative dielectric and conductivity images of formations in the region surrounding the borehole. The '507 Patent states that by obtaining measurements over a two-dimensional array, and using then known log interpretation techniques, one can obtain, for example, two-dimensional maps of water-filled porosity. The tool of the '507 Patent is also stated to be useful in permitting obtainment of azimuthal measurements of dielectric constant and conductivity, for example when characterizing dipping or fractured beds and other heterogeneities such as vugs or localized washouts. Reference can also be made to U.S. Pat. Nos. 5,243,290 and 5,345,179.

Dielectric logging tools, such as those described, measure effective formation permittivity and conductivity. The formations consist of the rock matrix and the pore fluids (usually hydrocarbon and water). In order to deduce the volumetric fraction of water from the effective permittivity, one has to know the relationship (the so-called mixing law) between the properties of the constituents and their mixture. Among several existing dielectric mixing laws, the CRIM (Complex Refractive Index Method) has been one of the most widely utilized formulas in the area of petrophysics (see e.g. Calvert, T. J., Rau N. R., "Electromagnetic Propagation, A New Dimension In Looging", SPE 6542, 1977.) Also, variations of CRIM were developed, such as the CTA (Complex Time Average) method (Cheruvier E., Suau J., "Application of Microwave Dielectric Measurements in Various Logging Environments", 1986, SPWLA 27$^{th}$ Annual Logging Symposium). Mixing laws require knowledge of the matrix and fluid complex permittivity at downhole conditions. Often it is difficult to predict these values accurately due to unknown matrix mineral composition and the resistivity of the formation water.

The conventional resistivity interpretation method becomes unreliable if the formation water resistivity is unknown or if it is very high. Additionally, the cementation and saturation exponents of the fundamental Archie relationship (which relates measured resistivity to water resistivity and water saturation) can vary with depth and/or radius, thereby complicating the accurate evaluation of the formation water saturation. Also, the texture of formations can have a major impact on hydrocarbon productibility and can affect downhole measurements. This characteristic currently cannot be determined in-situ and usually requires an expensive and time-consuming coring program.

It is among the objects of the present invention to devise and/or improve methods for accurately estimating the cementation and saturation exponents from downhole measurements, hence allowing for more accurate determination of water saturation and hydrocarbon saturation. It is also among the objects of the present invention to provide techniques that take rock texture into account in determination of characteristics relating to formation permittivity and conductivity and in the computation of water saturation and other formation characteristics.

SUMMARY OF THE INVENTION

The present invention relates, inter alia, to techniques for determining formation characteristics using measurements of dielectric permittivity at a number of frequencies. Embodiments of the invention relate to determination of the vertical and horizontal formation dielectric constant and conductivity, the formation water conductivity, the water saturation, the cementation and the saturation exponents. In laminated formations these profiles can be determined for each lamina. Also, formation dielectric properties are used in determination of the rock type.

A form of the invention is directed to a method for determining the cementation and the saturation exponent of earth formations surrounding a borehole, comprising the following steps: deriving, from measurements of electromagnetic energy in the formations, at a plurality of frequencies, a respective plurality of formation permittivities and a respective plurality of formation conductivities; and determining, using said plurality of formation permittivities and formation conductivities, the cementation and the saturation exponent of the formations. The plurality of frequencies comprises at least two and, preferably, at least three frequencies, and the frequencies are, for example, in the range of about 100 MHz to 1 GHz. In an embodiment of this form of the invention, the step of determining, using said plurality of formation permittivities and formation conductivities, the cementation and the saturation exponent of the formations, includes the following steps: determining, using said plurality of formation permittivities and formation conductivities, the formation water saturation and the formation DC resistivity; selecting a further water saturation and deriving a corresponding further DC resistivity; and determining said cementation and said saturation exponent using said formation water saturation, said further water saturation, said formation DC resistivity, and said further DC resistivity. [As used herein, DC resistivity includes resistivity at low frequencies where displacement currents can be neglected.] The permittivities of the formation matrix and hydrocarbons, and the formation water salinity, can be used in said steps of determining said formation water saturation and formation DC resistivity, and said further DC resistivity. Also, in an embodiment of this form of the invention, the step of determining, using said plurality of formation permittivities and formation conductivities, the formation water saturation and the formation DC resistivity, includes the following steps: inverting, using a dispersion model and said plurality of formation permittivities and formation conductivities, to obtain said formation water saturation; deriving, using said plurality of formation permittivities and formation conductivities, and said obtained formation water saturation, a formation conductivity dispersion curve; and determining, from said formation conductivity dispersion curve, the formation DC resistivity.

In another embodiment of the foregoing form of the invention, said step of inverting, using a dispersion model and said plurality of formation permittivities and formation conductivities, is operative to further obtain the salinity of the formation water and the permittivity of the formation matrix. Also in this embodiment, said step of inverting, using a dispersion model and said plurality of formation permittivities and formation conductivities, is operative to further obtain rock texture parameters of the formation matrix. The rock texture parameters may comprise, for example, aspect ratios of rock grains of the formation matrix or spherical grains and ellipsoidal micropores of the formation matrix. The rock texture parameters may also comprise aspect ratios of macropores, grains, and hydrocarbons.

In another embodiment of this form of the invention, at least some of said measurements of electromagnetic energy in said formations are taken at different depths of investigation, and/or different polarizations, and the step of determining the cementation and the saturation exponent of the formations comprises determining a radial profile of at least one of said cementation and said saturation exponent. The comparison between cementation exponents at different depths of investigation can be an indication of the quality of the inversion. In still another embodiment at least some of said measurements of electromagnetic energy in said formations are taken at different depths of investigation, and/or different polarizations, and the step of inverting to obtain said formation water saturation comprises inverting to obtain a radial profile of formation water saturation. The computation of saturation exponent can also be carried out using measurements at different depths of investigation with different water saturations.

In accordance with a further form of the invention, a method is set forth for determining a radial profile of permittivity and/or conductivity of anisotropic earth formations surrounding a borehole, comprising the following steps: deriving, from measurements of electromagnetic energy in said formations, at a plurality of frequencies, and at different depths of investigation, and/or at different polarizations, a respective plurality of formation permittivities and a respective plurality of formation conductivities; and determining, using said plurality of formation permittivities and formation conductivities, a radial profile of vertical and horizontal permittivity and/or a radial profile of vertical and horizontal conductivity. From these profiles, assuming laminated formations with two kinds of intertwined layers, and knowing the volumetric fractions of the laminations, one can determine individual permittivities of each type of lamina.

In accordance with another form of the invention, a method is set forth for determining effective permittivity of earth formations surrounding a borehole, comprising the following steps: deriving a mixing law permittivity as volumetric fractions of formation matrix, water, and hydrocarbon permittivities; deriving an effective permittivity model as a function of mixing law permittivity and rock texture parameters; deriving, from measurements of electromagnetic energy in said formations, at a plurality of frequencies, a respective plurality of formation permittivities and a respective plurality of formation conductivities; and determining effective permittivity of said formations using said model and said derived plurality of formation permittivities and formation conductivities.

Further features and advantages of the invention will become more readily apparent from the following detailed description when taken in conjunction with the accompanying drawings.

BRIEF DESCRIPTION OF THE DRAWINGS

FIG. 9 shows a Table relating rock type to dielectric dispersion properties.

FIG. 10 shows a graphical representation of oil, brine, and matrix of a dual porosity model used in an embodiment of the invention.

DETAILED DESCRIPTION

Figure 1:
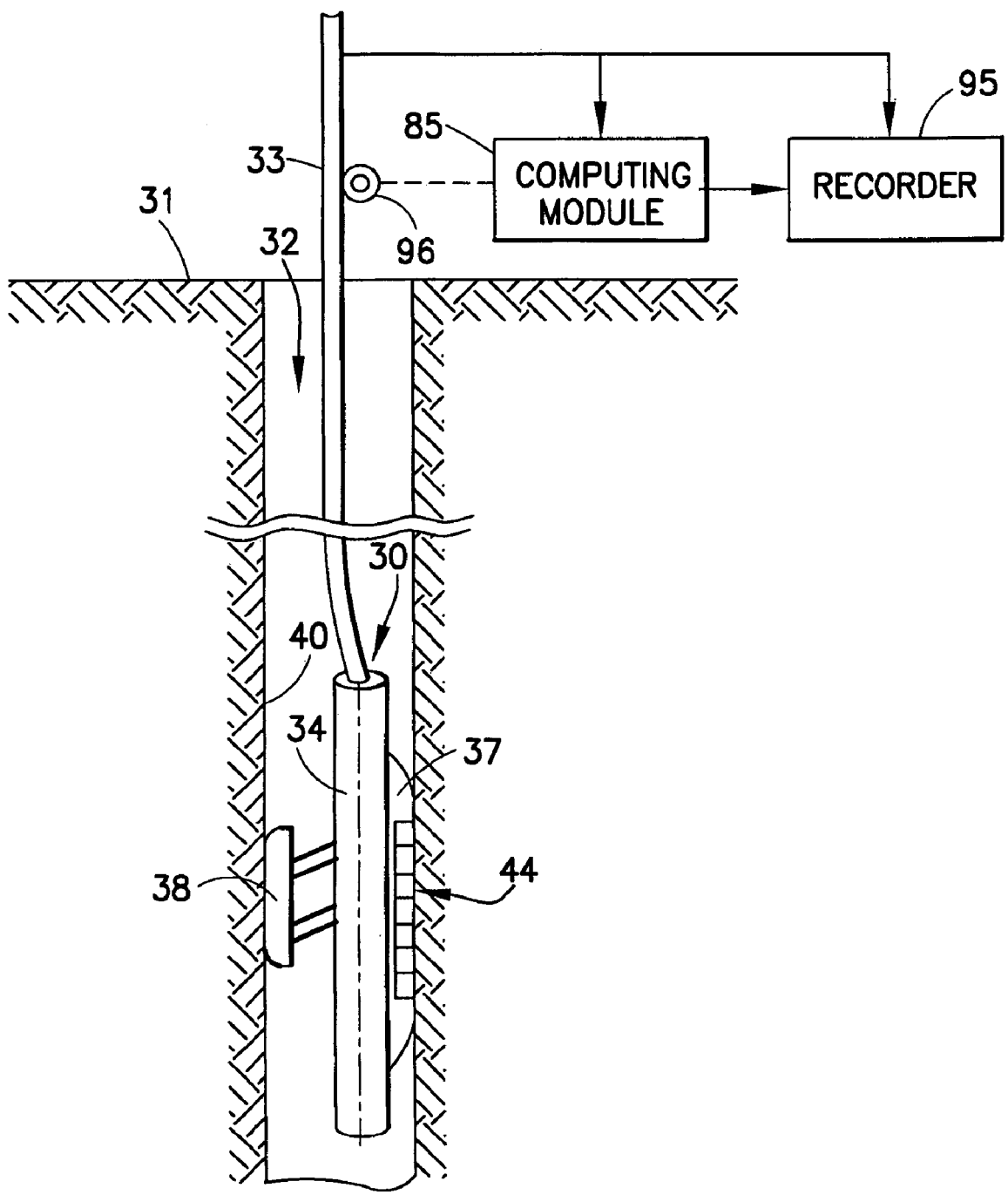
FIG. 1 is a schematic representation, partially in block diagram form, of apparatus which can be used in practicing embodiments of the invention.

Referring to FIG. 1, there is shown an apparatus 30, for investigating subsurface formations 31 traversed by a borehole 32, which can be used in practicing embodiments of the invention. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 can form on the walls of the borehole.

The investigating apparatus or logging device 30 is suspended in the borehole 32 on an armored cable 33, the length of which substantially determines the relative depth of the device 30. (The invention can also have application to measurement while drilling or measurement while tripping.) The cable length is controlled by suitable means at the surface such as a drum and winch mechanism (not shown). The logging device 30 includes an elongated cylindrical sonde 34, the interior portion of which has a housing containing the bulk of the downhole electronics. Mounted on one side of sonde 34 is a pad 37 which contains an array 44 of antennas. The logging device may, for example, be of a type disclosed in U.S. Pat. No. 5,434,507, and may have features as further disclosed in U.S. Pat. Nos. 5,243,290, and 5,345,179, although other suitable devices could be used. In an embodiment as disclosed in U.S. Pat. No. 5,434,507, the antennas 44 are cross-dipole antennas. On the other side of sonde 34 is mounted a backup arm 38 which may be hydraulically controlled to maintain the pad 37 in contact with the borehole wall. The backup arm 38 can also be used to provide a caliper reading. Signals can be stored downhole by memory associated with a downhole processor, and/or some or all signals can be transmitted uphole for processing and/or storage. Electronic signals indicative of the information obtained by the logging device can be transmitted through the cable 33 to a computing module 85 and a recorder 95, located at the surface of the earth. Depth information to the recorder 95 and computing module 85 can be provided from a rotating wheel 96 that is coupled to the cable 33. The computing module 85 will typically include a processor, and associated memory, timing, input/output, display, and printing functions, none of which are separately shown. Also, it will be understood that some or all of log processing and/or interpretation processing can be performed at locations remote from the borehole.

The cross-dipole antennas, that can be utilized in practicing embodiments hereof, as in the type of logging device described in the above-referenced U.S. Pat. No. 5,434,507, can be of the type disclosed in U.S. Pat. No. 5,243,290. In the U.S. Pat. No. 5,243,290, there is disclosed a cross-dipole antenna that can be energized to produce electromagnetic energy having a magnetic dipole characteristic. An embodiment of the antenna comprises a generally square aperture in a metal body. Metal probe elements cross the aperture from different opposing sides, but are notched at their centers, so as to not touch where they cross. A dielectric material fills the rest of the aperture. Each of the probes is shorted at one end to a wall of the aperture. The other end of each probe is coupled to a conductor wire which is insulated for passage through the antenna body, and is coupled with transmitter and/or receiver circuitry, depending on the intended purpose of the antenna.

Figure 2C:
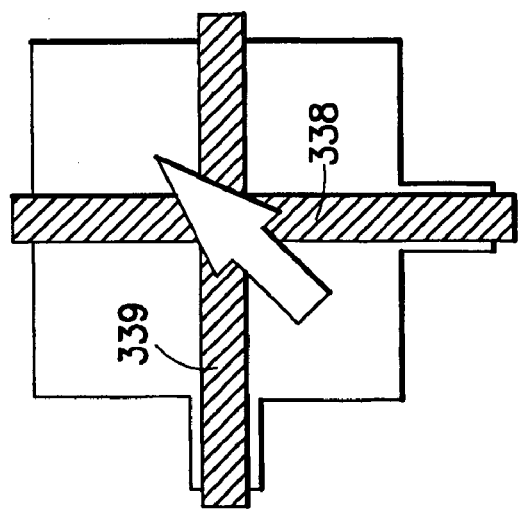
FIGS. 2A, 2B and 2C illustrate magnetic dipole moments that can be obtained with cross dipole antennas.
Figure 2B:
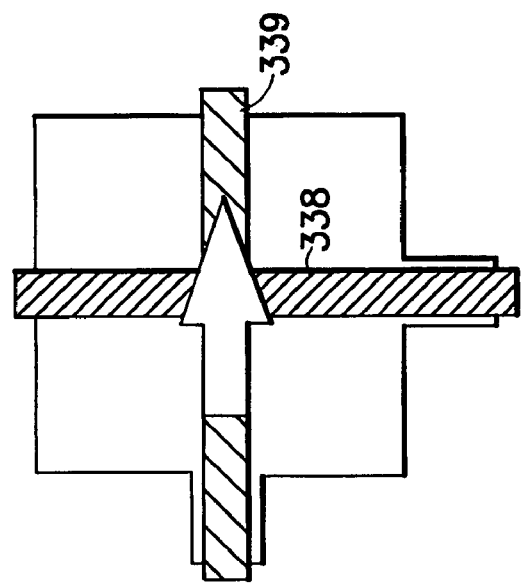
Figure 2A:
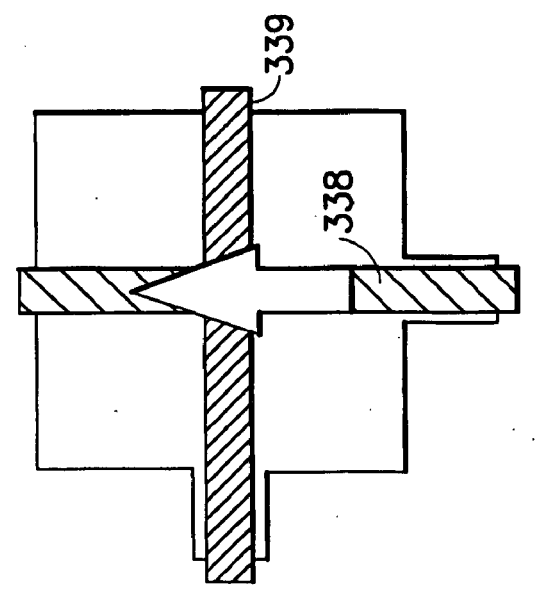

As further described in the U.S. Pat. No. 5,243,290, the cross-dipole antenna probes can be used to produce electromagnetic energy with a controlled magnetic moment direction (or angle). Referring, for example, to FIG. 2A, assume that the vertical probe element 339 is parallel to the longitudinal axis of the logging device and that the horizontal element 338 is perpendicular to said axis. Excitation of only the horizontal probe element (shown darkened) results in a vertical magnetic moment (as indicated by the arrow) and operation in an endfire mode. In the illustration of FIG. 2B, only the vertical probe element is excited, resulting in a horizontal magnetic moment and operation in a broadside mode. In FIG. 2C, both probe elements are excited by application of equal signals to the probe elements, resulting in a 45 degree magnetic moment, as shown. As further described in the referenced U.S. Pat. No. 5,243,290, application of signals of appropriate relative amplitudes and phases to the respective probe elements can produce a magnetic moment in any desired direction. Also, the antennas can be excited to operate in endfire and broadside modes either sequentially or simultaneously.

Figure 3:
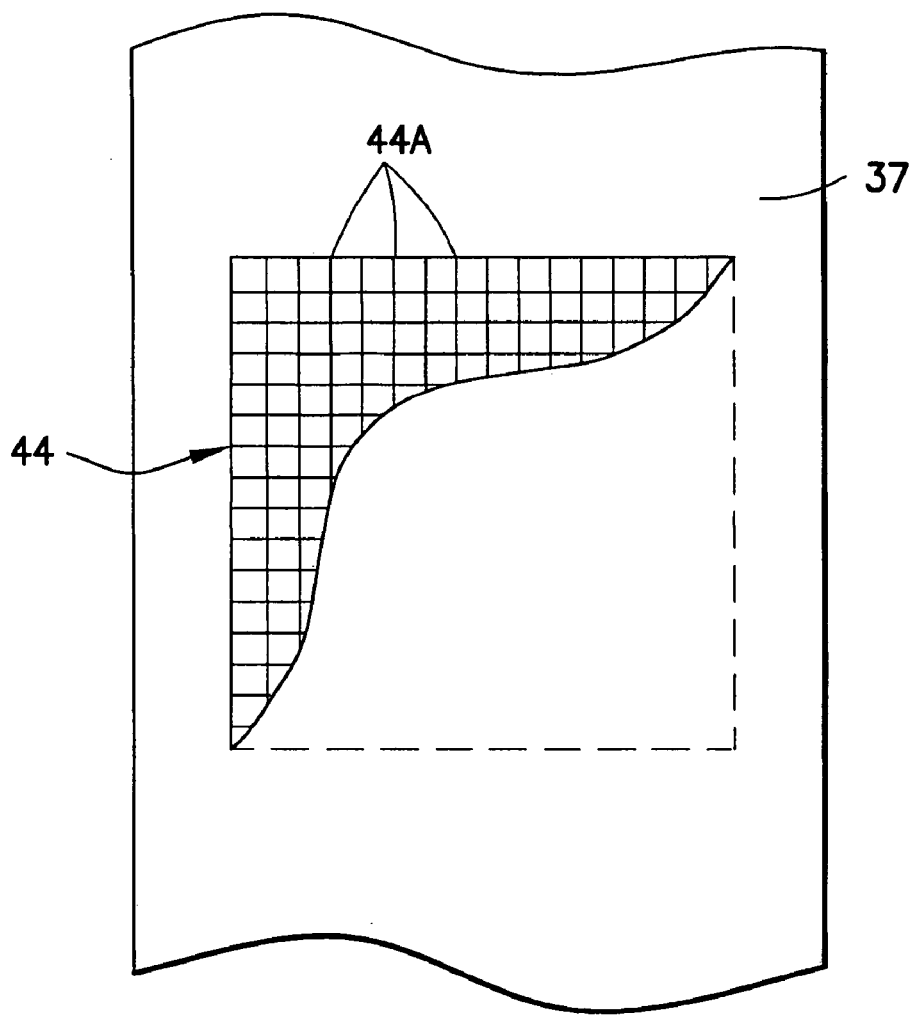
FIG. 3 is a partially broken away diagram of an antenna array that can be used in practicing embodiments of the invention.

FIG. 3 shows an example of a two-dimensional array 44 (as in FIG. 1) of cross-dipole antennas. As further described in U.S. Pat. No. 5,434,507, the antennas can be mounted in the pad 37 as a number of one-dimensional strips 44A of cross-dipole antennas, the strips being mounted side-by-side in the body of the pad. Alternatively, the individual cross-dipole antennas can be inserted as modules into a two-dimensional frame of square apertures. Each cross-dipole antenna element is addressable to be used as a transmitting antenna or a receiving antenna at a particular time under control of the processor.

An example of electronic circuitry for obtaining attenuation and phase shift measurements using the array of cross-dipole antennas, is described in detail in the referenced U.S. Pat. No. 5,434,507. (Processing to obtain permittivity and conductivity of the formations using the attenuation and phase measurements is also described in the above-referenced U.S. Pat. Nos. 3,849,721, 3,944,910, 4,704,581, 5,243,290, and 5,345,179.) By making the oscillators of such circuitry variable frequency oscillators (such as voltage controlled oscillators under control of the downhole processor), the measurements can be taken at any desired frequencies, for example frequencies in the range about 100 MHz to 1 GHz.

It has been shown that at 1 GHz the dielectric constant of carbonate rocks, filled with water and hydrocarbons, can often be closely approximated by the "Complex Refractive Index" (CRI) mixing law (N. Seleznev, A. Boyd, T. Habashy, S. Luthi, "Dielectric Mixing Laws for Fully and Partially Saturated Carbonate Rocks", Proceedings of the SPWLA 45th Annual Logging Symposium, Jun. 6-9, 2004, The Netherlands). However, the permittivity of rocks saturated with brine and hydrocarbons exhibits frequency dependence, so-called dispersion. The rock permittivity dispersion is not explained by the frequency dependence of the water permittivity alone and can vary in rocks with similar porosity, mineralogy and water saturation. Therefore, the frequency dependence of the rock permittivity has to be related to the rock texture. A feature of the present invention provides a new dispersion model that explicitly accounts for the influence of rock texture. One embodiment o the model considers ellipsoidal grains and pores dispersed in a CRI background medium. The effective permittivity is computed as follows:

$$\varepsilon_{\it eff} = \varepsilon_{cri} + \frac{\frac{1}{3}\sum_{j=1}^{n} f_j(\varepsilon_j - \varepsilon_{cri})\sum_{i=1}^{3}\frac{\varepsilon_{cri}}{\varepsilon_{cri} + N_j^i(\varepsilon_j - \varepsilon_{cri})}}{1 - \frac{1}{3}\sum_{j=1}^{n} f_j(\varepsilon_j - \varepsilon_{cri})\sum_{i=1}^{3}\frac{N_j^i}{\varepsilon_b + N_j^i(\varepsilon_j - \varepsilon_{cri})}} \qquad (1.1)$$

$$\varepsilon_{cri} = \left((1-\phi)\sqrt{\varepsilon_m} + \phi S_w\sqrt{\varepsilon_w} + (1-S_w)\phi\sqrt{\varepsilon_o}\right)^2 \qquad (1.2)$$

where $\in_{\it eff}$ is the effective permittivity of the composite rock, $\in_{cri}$ is the complex permittivity of the background computed from the CRI mixing law of equation (1.2); $\in_j$ is the complex permittivity of the j-th ellipsoidal inclusion phase with depolarization factors $N_j^i$ (i=1,2,3) and volumetric fraction $f_j$. Inclusion fractions are assigned as follows:

$$f_{matrix}=(1-\phi), f_{water}=\phi S_w, f_{oil}=\phi(1-S_w).$$

If $N^i$ is the depolarisation factor in the i-th axial direction, then for a general ellipsoid it is (Landau, L. D., and Lifshitz, E. M., "Electrodynamics of Continuous Media", London, Pergamon, p 417, 1960):

$$N^i = \int_0^\infty \frac{(abc)du}{2(u+i^2)\sqrt{(u+a^2)(u+b^2)(u+c^2)}} \qquad (1.3)$$

Figure 4:
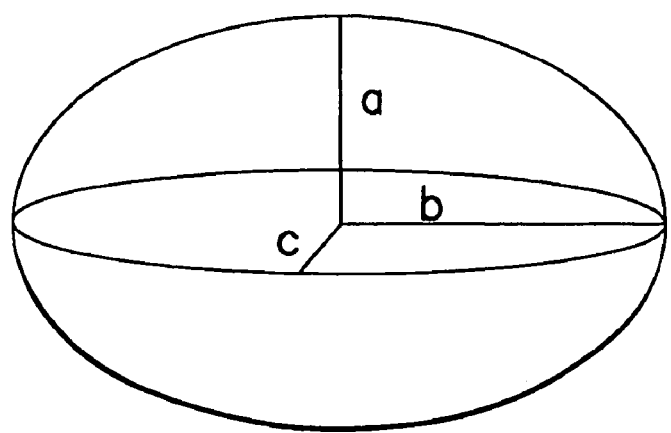
FIG. 4 shows a general ellipsoid with semi-axes a, b, and c.

$i = a, b, c$ (see Figure 4), and $N^a + N^b + N^c = 1$.

For prolate and oblate ellipsoids the depolarisation factors can be written in terms of their aspect ratios as.

For a prolate spheroid a>b=c $$N_a = \frac{1-e^2}{2e^3}\left(\ln\frac{1+e}{1-e} - 2e\right) \qquad (1.4)$$

$$N_b = N_c = \frac{1}{2}(1-N_a) \qquad (1.5)$$

where the ellipsoid eccentricity is given by $e=\sqrt{1-b^2/c^2}$.

For an oblate spheroid a=b>c $$N_c = \frac{1+e^2}{e^3}(e - \tan^{-1}e) \qquad (1.6)$$

$$N_a = N_b = \frac{1}{2}(1-N_c) \qquad (1.7)$$

where the ellipsoid eccentricity is $$e = \sqrt{a^2/c^2 - 1}.$$

Further considered will be a particular case of the model where pores, grains, and oil inclusions, dispersed in the background medium, are oblate spheroids. Thus, each phase will be described not only by the dielectric properties of the phase material and its volumetric fraction, but also by the geometrical parameter reflecting the shape of the phase inclusions. This geometrical parameter is the aspect ratio defined as the ratio of the long to the short axis of the oblate spheroid. It is noted that the invention hereof is not limited to this particular model. By including measurements at additional frequencies, the technique hereof can also be applied to a generic case of the dispersion model, or to more complicated mixing laws that may, for example, have a larger number of parameters.

Figure 5:
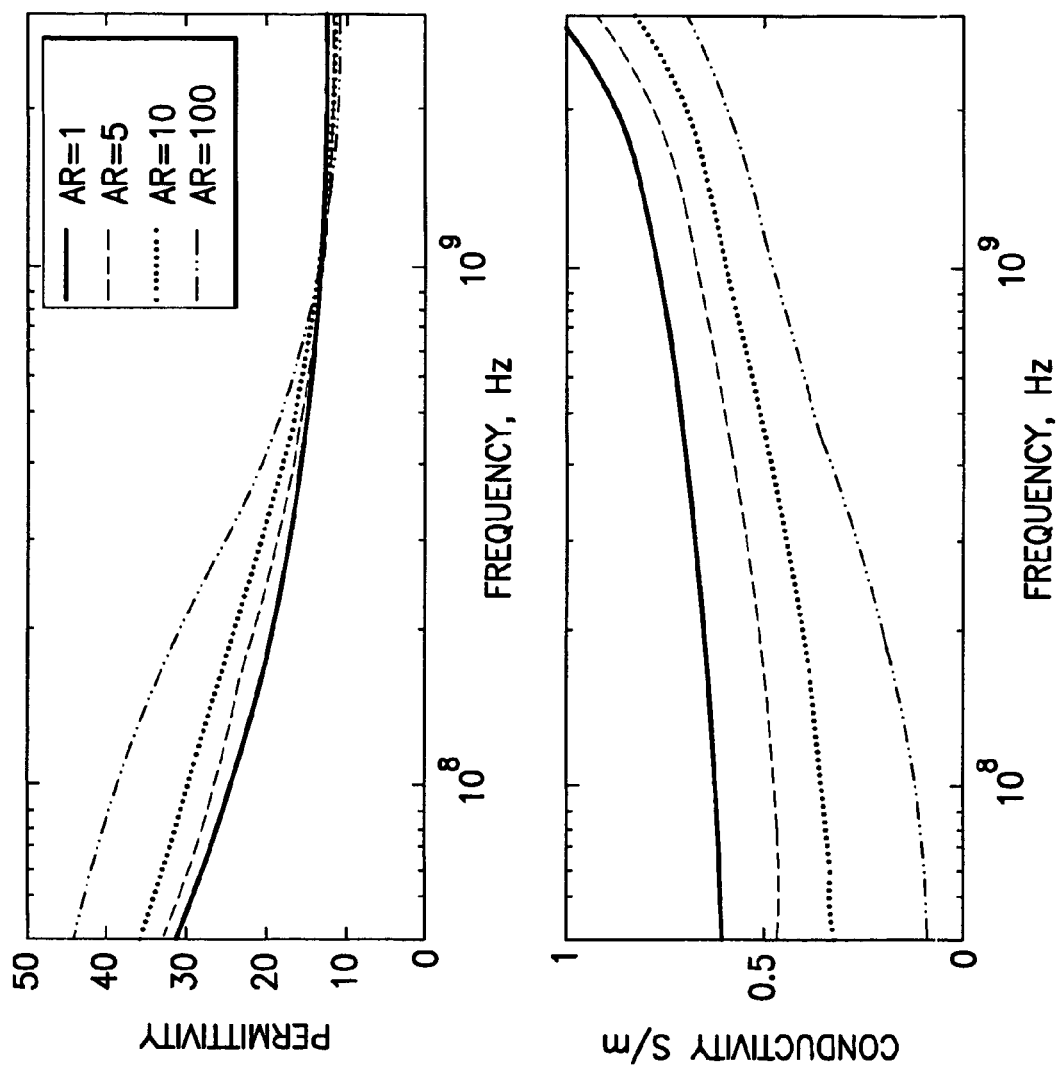
FIG. 5 shows, for an illustrative model, frequency dependence of the permittivity and conductivity of a two-phase mixture consisting of limestone grains and pores, filled with 5 S/m brine. The pores are oblate spheroids with an aspect ratio of 10, and the grains are oblate spheroids with an aspect ratio varying between 1 and 100.

FIG. 5 shows the frequency dependence of the permittivity and conductivity of a two-phase mixture consisting of limestone grains and pores, filled with 5 S/m brine. An aspect ratio of 10 is assigned to the oblate pores while the aspect ratio of the grains is varied between 1 and 100. Volume fraction of the conductive phase (brine) is 30%. The increasing grain aspect ratio leads to a more significant enhancement of the dielectric constant with decreasing frequency, and simultaneously lowers the conductivity of the rock. The grains, with high aspect ratio, impede the flow of current more effectively than the round grains, therefore decreasing the rock conductivity. Also, charges accumulate more effectively on the surface of the high aspect ratio grains than they do on the surface of the spherical grains. This leads to the enhancement of the rock permittivity at lower frequencies due to interfacial polarization. Hence, rocks with high aspect ratio grains, exhibit a stronger dielectric and conductivity dispersion.

Figure 6:
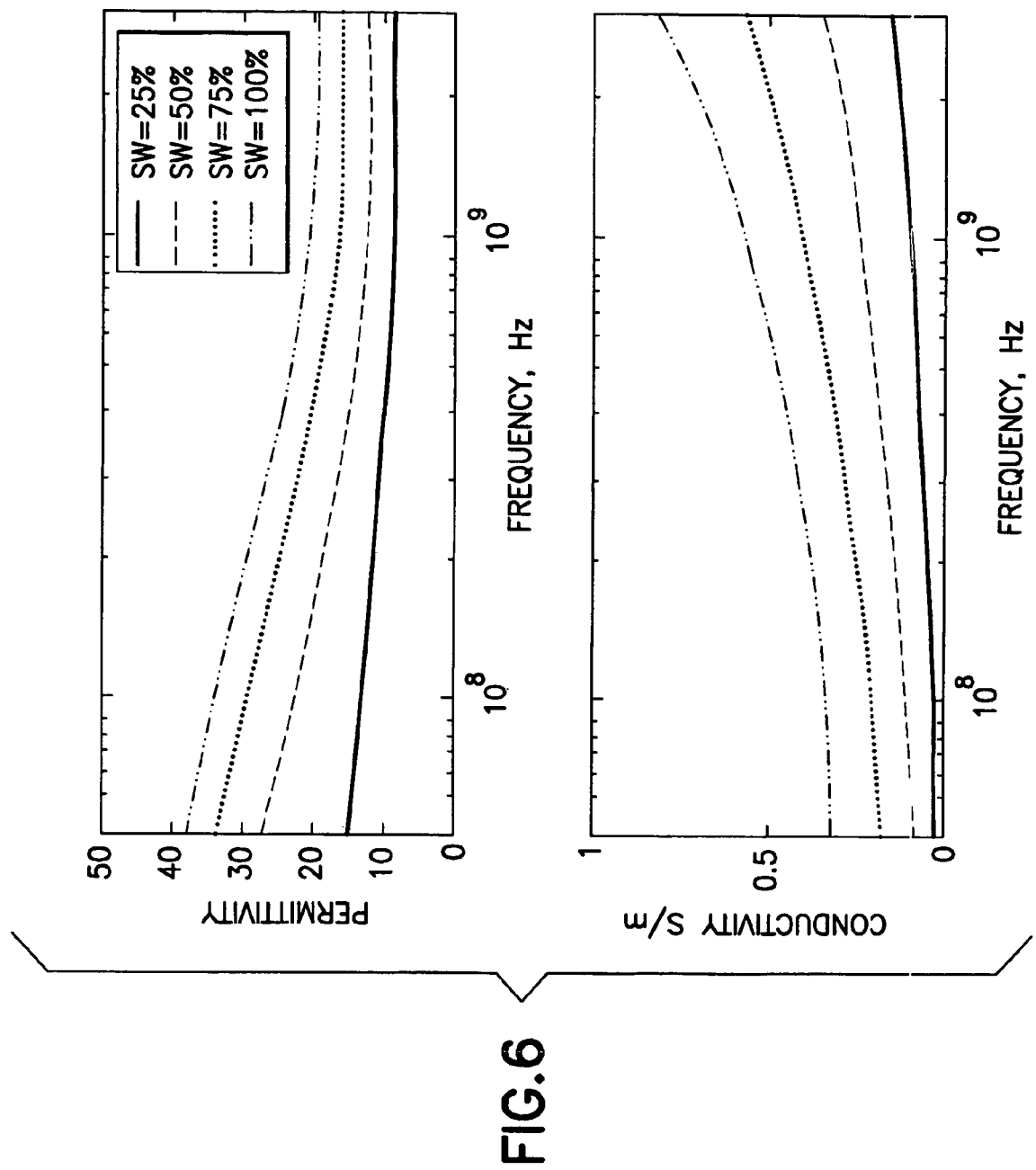
FIG. 6 shows, for an illustrative model, for a number of different water saturations, frequency dependence of the permittivity and conductivity of a three-phase mixture consisting of limestone grains, brine inclusions, and hydrocarbon inclusions. The grains and brine droplets are oblate spheroids with an aspect ratio of 10, and the hydrocarbon inclusions are oblate spheroids with an aspect ratio of 1.

The effect of varying water saturation is shown in FIG. 6. Pores and grains are oblate spheroids with aspect ratio of 10. Oil inclusions are assumed to be spherical. The rock porosity is 30% and the brine conductivity is 5 S/m. The reduction of water-filled porosity (water saturation) leads to smaller effective dielectric constant and conductivity. Not only does the value of permittivity decrease, but also its frequency-dependence changes. It becomes less dispersive with decreasing water saturation.

The model of the present embodiment involves the following parameters: the permittivities, volumetric fractions, and geometrical aspect ratios of rock matrix, formation water, and hydrocarbons. The permittivities of the matrix and hydrocarbons are real, and the permittivity of formation water is a frequency-dependent complex number. Therefore, there are ten unknown real parameters in the model. The sum of the volumetric fractions of all components is equal to 1, and the formation porosity can be estimated using other logging measurements. This reduces the number of unknown parameters to eight. There is a known relation between the dielectric constant of water and the water temperature and salinity (Klein, L., and Swift, T., "An Improved Model For The Dielectric Constant of Sea Water at Microwave Frequencies", IEEE Trans. On Antennas and Propagation, vol. AP-25, No. 1, 104-111, 1977). The relation between water salinity, temperature and conductivity is also well established (Desai, K. P. and Moore, E. J., "Equivalent NaCl Concentrations From Ionic Concentrations", The Log Analyst, May/June 1969). The formation temperature can be measured and this reduces the number of unknown parameters to seven. These parameters are: water saturation, permittivity of the rock matrix, permittivity of hydrocarbons, water salinity, and the three geometrical aspect ratios. The permittivity of hydrocarbons is often close to 2, thus reducing the total number of unknown parameters to six. If the permittivity of the rock matrix is known from a prior knowledge of the formation mineralogy, or from other logs, or if the salinity of the formation water can be predicted (e.g., for a sufficiently deep invasion, or no invasion), then the number of unknown parameters can be even further reduced.

Figure 7:
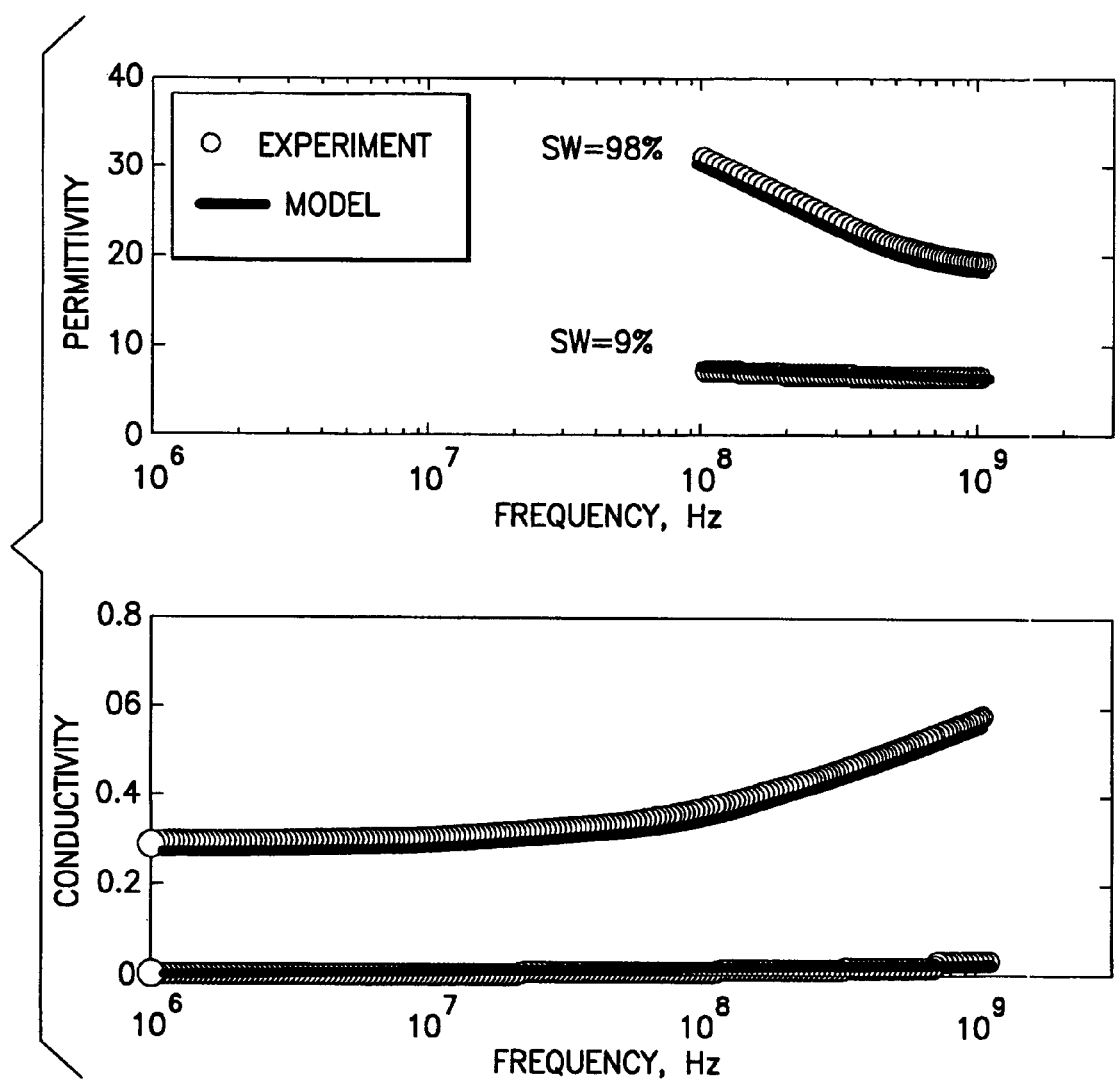
FIG. 7 shows, for an illustrative model, reconstruction of the dielectric and conductivity dispersion curves from multi-frequency dielectric measurements at various water saturations.

Dielectric measurements at multiple frequencies can be utilized for the determination of the unknown model parameters (see, also, copending U.S. patent application Ser. No. 11/233,718, filed of even date wherewith, and incorporated herein by reference). In order to determine six model parameters, the formation dielectric constant and conductivity at least three different frequencies is necessary. FIG. 7 shows a comparison of reconstructed dispersion curves with experimental data obtained at multiple partial saturations. The reconstructed curve was calculated based on the above dispersion model utilizing the dielectric and conductivity data in the range of 100 MHz to 1 GHz. The model parameters were kept constant for all saturations. It is evident that multi-frequency measurements allow reconstruction of the dielectric and conductivity dispersion curves in a wide frequency range. The reconstructed conductivity at low frequency agrees well with the conductivity measured independently with a four-terminal resistivity cell (open circles). It will be understood that the principles hereof can be applied to more complicated mixing laws that may have a larger number of parameters by including measurements at additional frequencies.

Figure 8A:
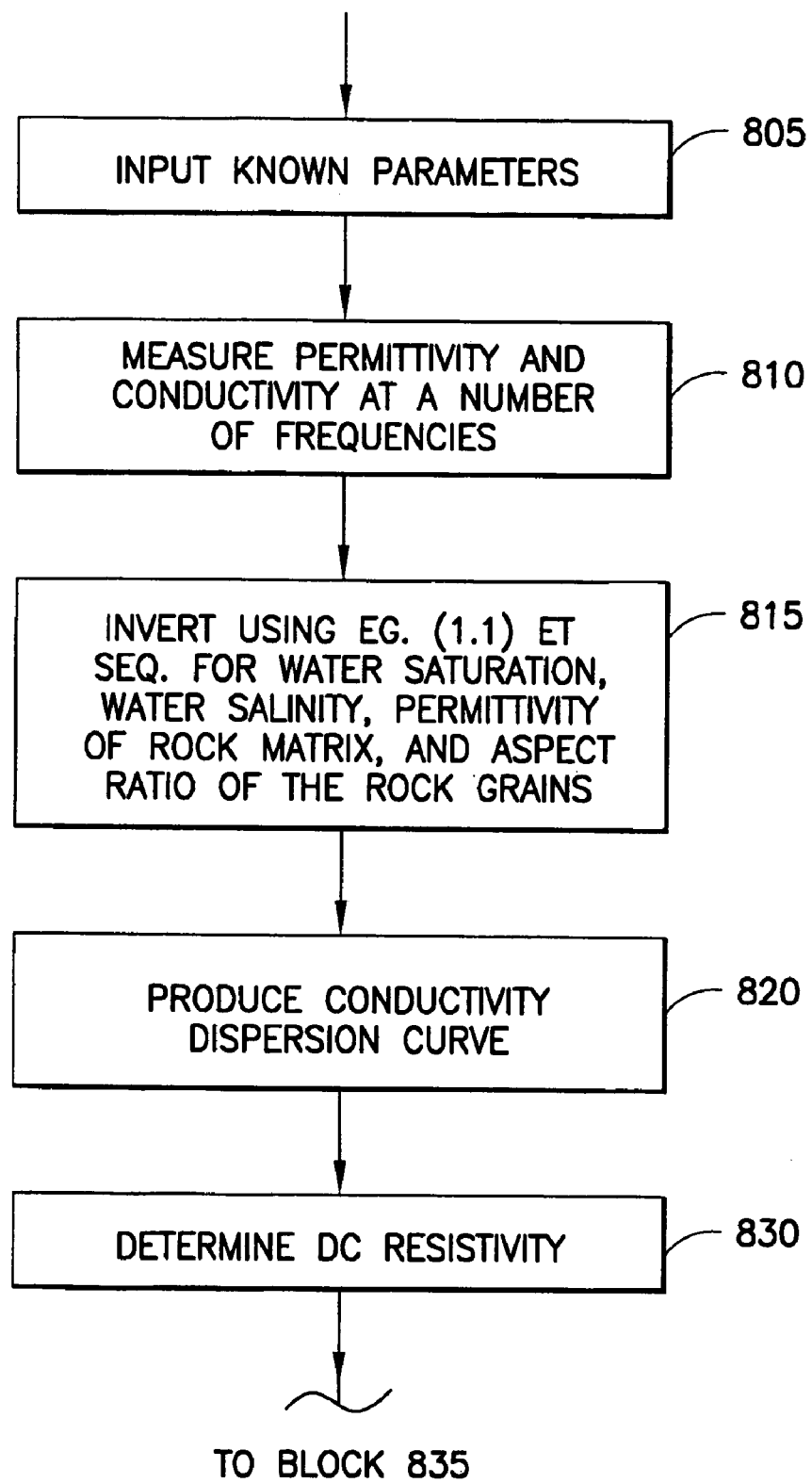
FIG. 8, which includes FIGS. 8A and 8B placed one below another, is a flow diagram of the steps of a routine for practicing an embodiment of the invention.
Figure 8B:
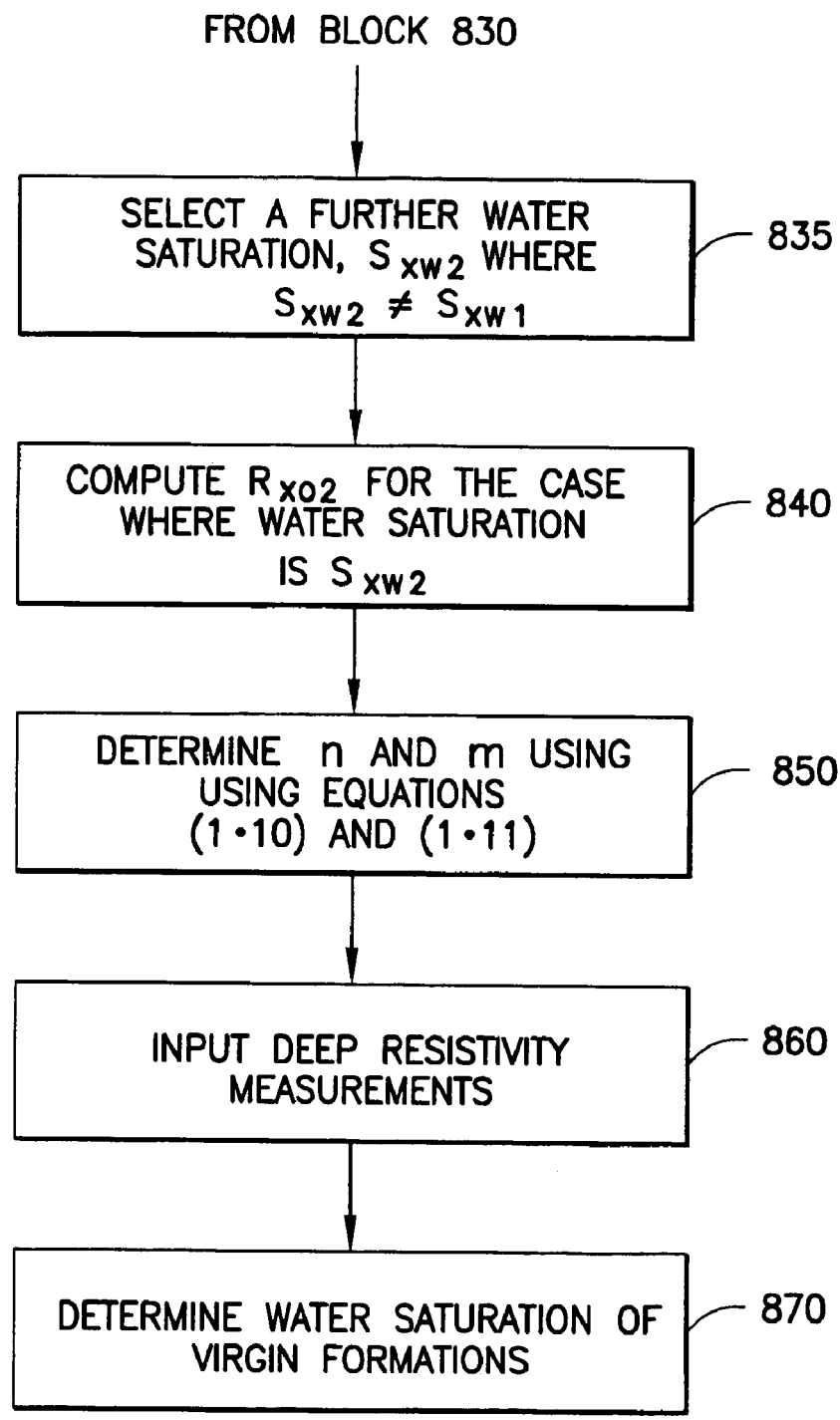

In accordance with a form of the present invention, a method is set forth for the determination of the cementation and saturation exponents from multi-frequency measurements. The steps of an embodiment of this form of the invention are described with reference to the flow diagram of FIG. 8. The block 805 represents the inputting of known or derived parameters. For example, as noted above, parameters such as formation porosity and/or temperature may be known or derived in some situations. The block 810 represents the measurement of permittivity at a number of frequencies, preferably three or more frequencies in the present embodiment. Then, as represented by the block 815, an inversion is performed, using, in this embodiment, equation (1.1) et seq., to obtain water saturation, water salinity, permittivity of rock matrix and the aspect ratios of rock grains, water and hydrocarbons in the pores, if the permittivity of hydrocarbons is assumed to be known. As represented by the block 820, the full conductivity dispersion curve is then obtained and, as represented by the block 830, a value of the low-frequency formation resistivity, $R_{xo1}$, is obtained. In clay-free carbonates, this parameter is related to the formation water resistivity, water saturation, formation porosity, and the cementation and saturation exponents via Archie's equation (Archie, G. E., "Electrical Resistivity, An Aid in Core-Analysis Interpretation", Bullet. of Amer. Assoc. of Petroleum Geolog., vol. 31, No. 2, pp. 350-366, 1947)

$$R_{xo1} = \frac{aR_{xw}}{\phi^m S_{xw1}^n} \qquad (1.8)$$

where a is a coefficient close to 1, $R_{xw}$ is the formation flushed zone water resistivity, $\phi$ is the porosity, $S_{xw1}$ is the water saturation, m is the cementation exponent, and n is the saturation exponent. Then, as represented by the block 835, a different water saturation, $S_{xw2}$, is selected where $S_{xw2} \neq S_{xw1}$. The low-frequency resistivity, $R_{xo2}$, for this case, is then computed (block 840) using the model parameters (aspect ratios, etc.) obtained in block 815, at this different water saturation. Again, using Archie's equation, the corresponding $R_{xo2}$ is related to the formation parameters of interest as $$R_{xo2} = \frac{aR_{xw}}{\phi^m S_{xw2}^n} \qquad (1.9)$$

From equations (1.8) and (1.9), the formation cementation and saturation exponents are calculated (block 850) as follows:

$$n = \frac{\log(R_{xo1}/R_{ox2})}{\log(S_{xw2}/S_{xw1})} \qquad (1.10)$$

$$m = \frac{\log(aR_{xw}/(R_{xo}S_{xw1}^n))}{\log(\phi^m)} \qquad (1.11)$$

The values of the cementation and saturation exponent can then be utilized in the calculation of the virgin formation water saturation using deep resistivity measurements. For example, in FIG. 8, the block 860 represents inputting measurements from a deep resistivity tool, and the block 870 represents determining water saturation of the virgin formations using the derived deep resistivity, total porosity, and the determined values of n and m.

The described technique can be applied to measurements obtained at various depths of investigation, resulting in a radial profile of the cementation and saturation exponents. The cementation exponent is expected to be constant with depth and it can be used as a quality check of the reconstruction routine. Alternatively, the cementation exponent can be constrained to be the same at all depths for increased robustness of the reconstruction. The saturation exponent may vary with radial distance from the borehole.

As first noted above, the well is drilled with the borehole pressure of the drilling fluid maintained above the pressure of the formation fluids in order to prevent the formation fluids from entering the well. As a result of the pressure gradient, the drilling fluid invades the permeable formations. The invasion process alters the initial state and creates the saturation and salinity profiles near the wellbore. Logging devices of the type described in conjunction with FIGS. 1-3 can be used to implement dielectric measurements with different depths of investigation, which allows for the radial profiling of the dielectric constant and conductivity. A form of the present invention utilizes multi-depth dielectric measurements for the determination of the cementation and the saturation exponents. Measurements at at least two depths are employed. At the first radial depth, the resistivity of the flushed zone, $R_{xo1}$, the water saturation, $S_{xw1}$, and the formation flushed zone water resistivity, $R_{xw1}$, are determined utilizing the technique described above, which uses the multi-frequency dielectric measurements at depth 1 and the above dispersion model. (As previously noted, other dispersion models can be used.) At a second radial depth, the resistivity of the flushed zone, $R_{xo2}$, the water saturation, $S_{xw2}$, and the formation water resistivity, $R_{xw2}$, are determined in a similar manner. The resistivity $R_{xo1}$ will be different from $R_{xo2}$ because of the differences in water saturation at the two radial depths after invasion. The saturation and cementation exponents are determined from the obtained resistivity values as follows:

$$R_{xo1} = \frac{aR_{xw1}}{\phi^m S_{xw1}^n} \quad (1.12)$$

$$R_{xo2} = \frac{aR_{xw2}}{\phi^m S_{xw2}^n} \quad (1.13)$$

$$n = \frac{\log\left(\frac{R_{xo1}}{R_{xo2}} \cdot \frac{R_{xw2}}{R_{xw1}}\right)}{\log\left(\frac{S_{xw2}}{S_{xw1}}\right)} \quad (1.14)$$

$$m = \frac{\log(aR_{xw1}/(R_{xo1}S_{xw1}^n))}{\log(\phi)} \quad (1.15)$$

The total porosity, $\phi$, is available from downhole measurements, such as the combination of the neutron and density porosities, which can be implemented, for example, as part of a tool string such as in FIG. 1, or separately. The saturation exponent is expected to vary with radial depth due to invasion of mud filtrate. Therefore, the described method can output a value of the saturation exponent intermediate between the actual saturation exponents at the two radial depths.

The dielectric measurements at several depths of investigation allow determining the near-wellbore radial profile of the dielectric constant, formation conductivity, conductivity of the formation fluid and the formation fluid salinity. The invasion profile can be reconstructed from this information.

Although the preferred method for the evaluation of the saturation and cementation exponents is the multi-frequency dielectric measurements, in principle, the cementation and saturation exponents can be determined with a combination of a multi-depth dielectric measurement and a multi-depth $R_{xo}$ measurement. The water saturation at multiple depths can be determined from the dielectric measurements, and in combination with the independent $R_{xo}$ measurement at multiple depths, the cementation and saturation exponents can be calculated using equations (1.14) and (1.15).

The rock dielectric dispersion can be utilized (by itself or in combination with other measurements) for the determination of rock types. The table of FIG. 9 shows the experimental correspondence between rock types and their dielectric properties. In reservoir formations the analysis of the rock dispersion properties is complicated by the presence of hydrocarbons, which influence the rock dielectric constant and its dependence on frequency. In accordance with a feature hereof, rock typing is implemented using the textural parameters (such as the aspect ratios) determined from the multi-frequency dielectric measurements. The higher aspect ratio grains will correspond to more dispersive rocks. In addition to rock-typing using textural parameters from the described models, other parameters obtained from the dielectric data can also be applied towards distinguishing rock types.

A further aspect of the invention relates to determination of the vertical and horizontal dielectric constants and conductivities in anisotropic formations using multi-polarization dielectric measurements. For a cross-dipole dielectric tool, the magnetic field is given by:

$$H_z = -2\frac{M_z}{i\omega\mu_0}(1 - ik_l L)\frac{e^{ik_l L}}{4\pi L^3}, \quad \text{for endfire} \quad (1.16)$$

$$H_y = \frac{M_z}{i\omega\mu_0}\left\{1 - ik_l L - \frac{1}{2}(k_l^2 - k_v^2)L^2\right\}\frac{e^{ik_l L}}{4\pi L^3}, \quad \text{for broadside} \quad (1.17)$$

where $$k_l^2 = \omega^2\mu_0\varepsilon_l + i\omega\mu_0\sigma_l \quad (1.18)$$

$$k_v^2 = \omega^2\mu_0\varepsilon_v + i\omega\mu_0\sigma_v \quad (1.19)$$

From equation (1.16) the horizontal $\varepsilon_l$ and $\sigma_l$ can be estimated from the endfire response. From equation (1.17), the vertical $\varepsilon_v$ and $\sigma_v$ can then be estimated from the broadside response.

A further aspect of the invention involves determination of the dielectric constant, conductivity and water saturation of the individual fractions in a layered formation based on multi-polarization dielectric measurements. Thinly laminated formations can sometimes be significant hydrocarbon reservoirs. Often such formations are anisotropic (in both conductivity and dielectric constant) due to the presence of water bearing thin beds (shale layers, for example) and oil-bearing layers. A formation is considered to be "thinly laminated" if the laminations are smaller than the resolution of the logging tool used to measure the anisotropy of the dielectric constant.

The complex dielectric constant measured parallel to the formation layers is governed by the following equation:

$$\varepsilon_{hor} = \sum_{n=1}^{N} \phi_n \varepsilon_n \qquad (1.20)$$

where N is the number of layers, $\varepsilon_n$ is the complex permittivity of the N-th layer, and $\phi_n$ is the volumetric fraction of the N-th layer, with $$\sum_{n=1}^{N} \phi_n = 1.$$

The complex dielectric constant measured perpendicular to the formation layers is governed by the following equation:

$$\varepsilon_{ver}^{-1} = \sum_{n=1}^{N} \phi_n \varepsilon_n^{-1} \qquad (1.21)$$

Consider a layered formation consisting of two different minerals (such as shale/sand laminae), where N=2. From equations (1.20) and (1.12), the complex dielectric constants $\varepsilon_{ver}$ and $\varepsilon_{hor}$ can be determined if the volumetric fraction of at least one of the minerals is known, as follows:

$$a = \frac{\phi_2}{\phi_1} \qquad (1.22)$$

$$b = \left[\varepsilon_v \phi_1 - \frac{\phi_2^2}{\phi_1}\right] \qquad (1.23)$$

$$c = \varepsilon_h \left[\frac{\phi_2}{\phi_1} - \frac{\varepsilon_2}{\phi_1}\right] \qquad (1.24)$$

$$\varepsilon_2 = \frac{-b \pm \sqrt{b^2 - 4ac}}{2a} \qquad (1.25)$$

$$\varepsilon_1 = \frac{\varepsilon_h - \phi_2 \varepsilon_2}{\phi_1} \qquad (1.26)$$

An anisotropy can also arise if the fine-grained facies are intertwined with the coarse grained ones because of the different amount of irreducible water in layers. In such case, a similar approach can be applied, except that the fraction of the fine-grained or the coarse-grained material has to be known. The volumetric fraction of shale or the fine-grained fraction of the layered formation can be obtained using known techniques, such as nuclear magnetic resonance logging, high-resolution resistivity logging, elemental capture spectroscopy logging, or gamma ray logging.

Once the complex dielectric constant of the individual fraction of the layered formation is estimated, the determination of water saturation and the rest of the model parameters of interest for this fraction can be carried out as in the case of a homogeneous formation. Alternatively, the vertical and horizontal resistivities, $R_{oxoVer}$ and $R_{xoHor}$, can be determined from the multi-frequency and multi-polarization dielectric measurements. Then, the water saturations of the individual fractions of the layered formation can be determined by known methods.

In accordance with a further aspect of the invention, another dispersion model, is utilized, and is based on the fact that carbonate rocks often have a dual-porosity system where, in addition to intergranular macroporosity, intragranular microporosity is also present. Correspondingly, in a dual porosity model, the rock is seen as a mixture of spherical composite grains containing microporosity and ellipsoidal macropores. Composite grains consist of ellipsoidal micropores filled with conductive brine and spherical solid matrix grains. Partial saturation with oil is achieved by gradually filling macropores. The model can be extended to account for oil entering the microporosity at the extreme stages of drainage. The model can be extended to account for oil-wet rocks as well. FIG. 10 shows a graphical representation of a dual porosity model.

The effective complex permittivity of the mixture can be calculated in two steps. First, the two-component Bruggeman equation is used to calculate the permittivity of aggregates made of spherical matrix grains and ellipsoidal micropores filled with water as follows:

$$2(1-\phi)\frac{\varepsilon_m - \varepsilon^*}{\varepsilon^*(1-N_a^m) + N_a^m \varepsilon_m} + (1-\phi)\frac{\varepsilon_m - \varepsilon^*}{\varepsilon^*(1-N_b^m) + N_b^m \varepsilon_m} + \qquad (1.27)$$

$$2\phi\frac{\varepsilon_w^* - \varepsilon^*}{\varepsilon^*(1-N_a^w) + N_a^w \varepsilon_w^*} + \phi\frac{\varepsilon_w^* - \varepsilon^*}{\varepsilon^*(1-N_b^w) + N_b^w \varepsilon_w^*} = 0$$

The micropores take the shape of oblate or prolate spheroids, and their aspect ratio is chosen sufficiently high to ensure percolation of the conductive phase and non-zero DC conductivity of the composite grains. Next, the three-component Bruggeman equation is applied to the mixture of composite grains, ellipsoidal micropores filled with brine, and ellipsoidal macropores filled with oil as follows:

$$2(1-\phi)\frac{\varepsilon_m - \varepsilon^*}{\varepsilon^*(1-N_a^m) + N_a^m \varepsilon_m} + \qquad (1.28)$$

$$(1-\phi)\frac{\varepsilon_m - \varepsilon^*}{\varepsilon^*(1-N_b^m) + N_b^m \varepsilon_m} + 2\phi S_w \frac{\varepsilon_w^* - \varepsilon^*}{\varepsilon^*(1-N_a^w) + N_a^w \varepsilon_w^*} +$$

$$\phi S_w \frac{\varepsilon_w^* - \varepsilon^*}{\varepsilon^*(1-N_b^w) + N_b^w \varepsilon_w^*} + 2\phi(1-S_w)\frac{\varepsilon_o - \varepsilon^*}{\varepsilon^*(1-N_a^o) + N_a^o \varepsilon_o} +$$

$$\phi(1-S_w)\frac{\varepsilon_o - \varepsilon^*}{\varepsilon^*(1-N_b^o) + N_b^o \varepsilon_o} = 0$$

The microporous grains are spherical. The large pores filled with water or oil are ellipsoids with different aspect ratios. The following example illustrates an embodiment of the technique.

Figure 11:
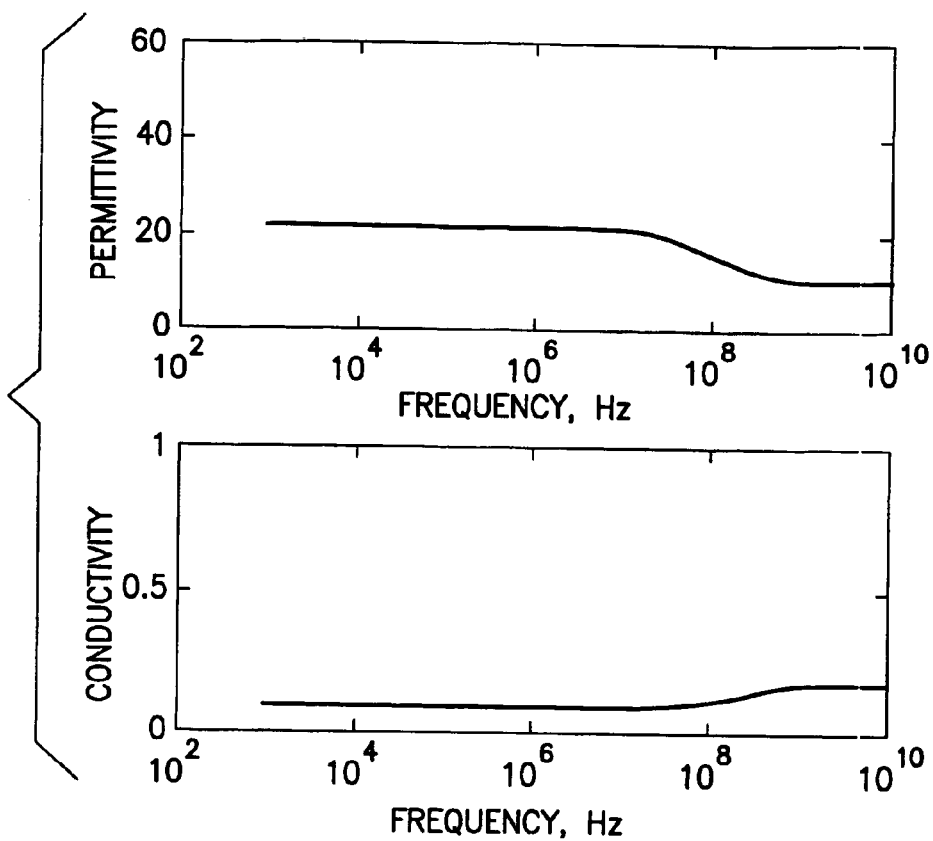
FIG. 11 shows, for an illustrative model, permittivity and conductivity dispersion curves of a composite microporous grain obtained from a dual porosity model (step 1 of the example). The microporosity is 7% and the aspect ratio of the oblate micropores is 50. Brine conductivity is 5 S/m. Matrix permittivity is 7.5 and conductivity is neglected.

Stage 1: The microporous host is filled with 5 S/m brine, with the microporosity fixed at 7%. The aspect ratio of oblate micropores is 50 and the solid matrix grains are spherical. The matrix permittivity is 7.5, and its conductivity is neglected. The cementation exponent of the microporous grain effective is equal to 1.5. FIG. 11 shows the permittivity (upper graph) and conductivity (lower graph), at this stage, as a function of frequency.

Figure 12:
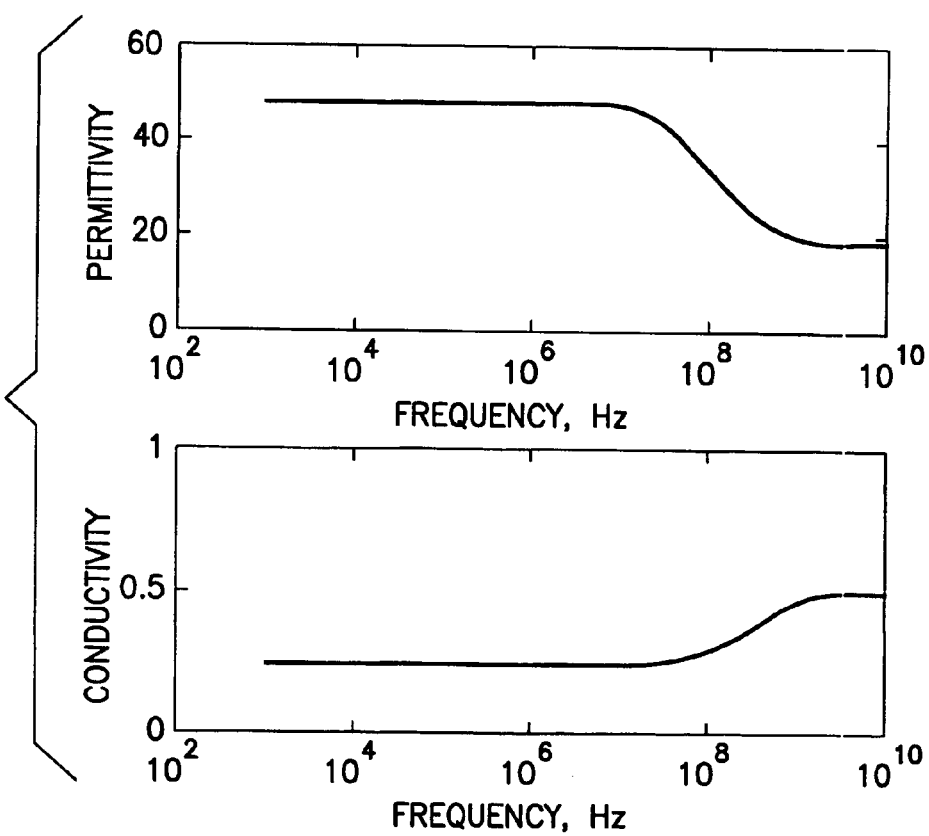
FIG. 12 shows, for an illustrative model, permittivity and conductivity dispersion curves obtained from the dual porosity model (step 2 of the example).

Stage 2: The macropores are now mixed with the microporous host, making the total porosity equal to 30%. The rock is fully saturated with 5 S/m brine. In FIG. 12 the frequency dependence of the mixture conductivity and permittivity is presented. The macropores are spherical, which makes this case a model for vuggy carbonates.

Figure 13:
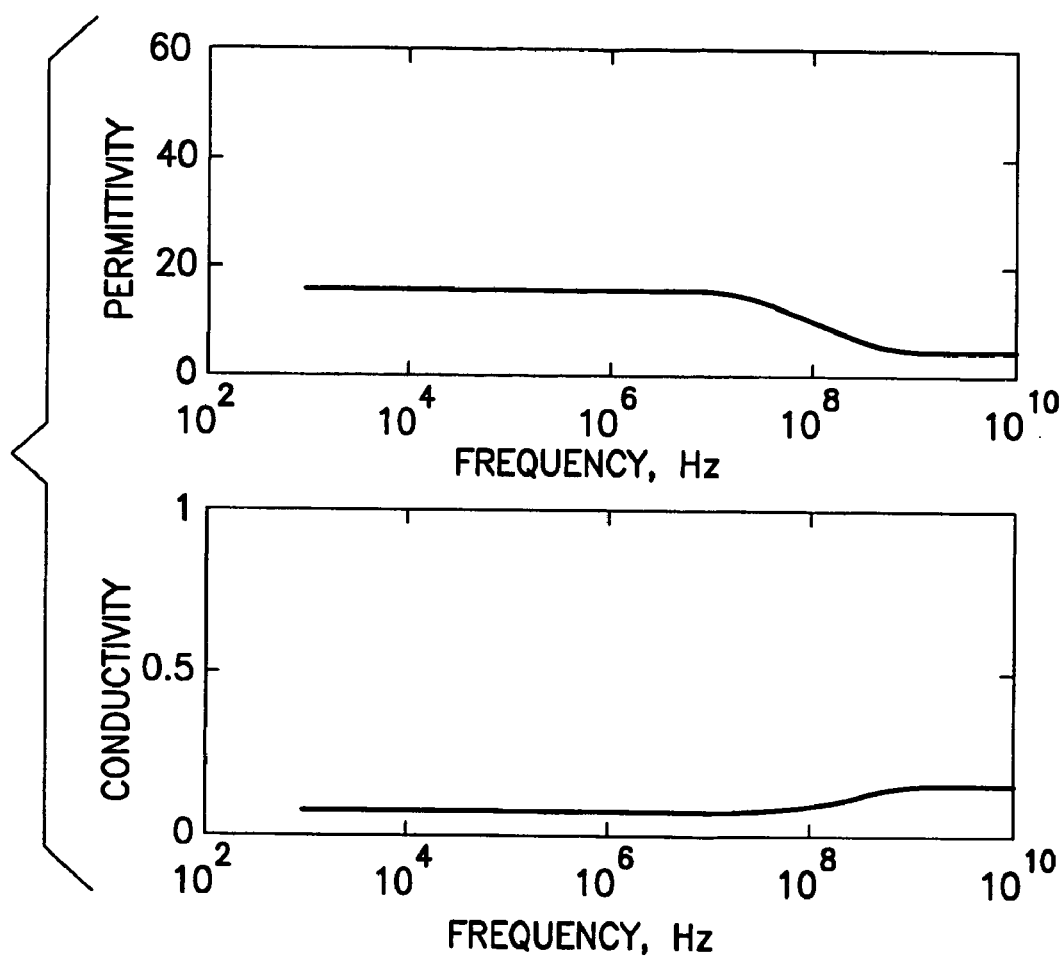
FIG. 13 shows, for an illustrative model permittivity and conductivity dispersion curves obtained from the dual porosity model (step 3 of the example).

Stage 3: All vugs are then filled with oil, and the microporous host remains brine-saturated (case of irreducible water saturation). The modelled permittivity and conductivity dispersion curves for this situation are shown in FIG. 13.

Figure 14:
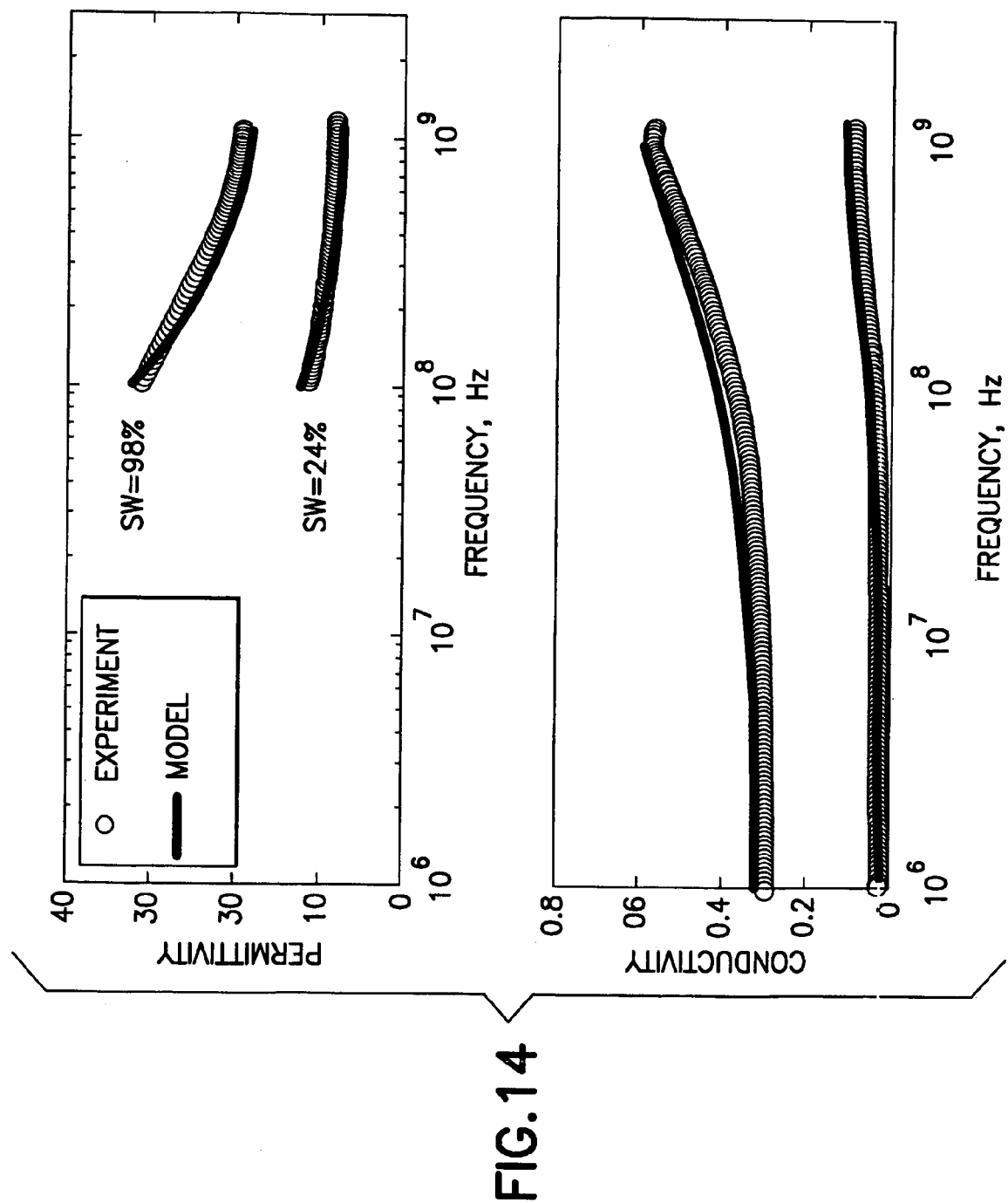
FIG. 14 shows, for an illustrative model, curves fitted into experimental data for a carbonate rock at two different water saturations.

A comparison of the reconstructed dispersion curves with the experimental data obtained at two partial saturations is shown in FIG. 14. Permittivity is shown in the upper graph, and conductivity in the lower graph. The reconstructed curves were calculated based on the above dual-porosity model utilizing the dielectric and conductivity data in the range of 100 MHz to 1 GHz. The model parameters were kept constant for both saturations. It is evident that multi-frequency measurements allow reconstruction of the dielectric and conductivity dispersion curves in a wide frequency range.

The dual-porosity model of this embodiment has the following parameters: microporosity, the aspect ratio of micropores, macroporosity, the aspect ratio of macropores, hydrocarbon saturation, the aspect ratio of hydrocarbon inclusions, the permittivities of water, matrix and hydrocarbons. Therefore, the model requires ten parameters, similarly to the first model. Applications suggested for the first dispersion model are also applicable to the dual-porosity model.

The invention has been described with reference to particular preferred embodiments, but variations within the spirit and scope of the invention will occur to those skilled in the art. For example, as above indicated, it will be understood that the invention has application to models other than those illustrated.

The invention claimed is:

1. A method for determining and recording the cementation and the saturation exponent of earth formations surrounding a borehole, comprising the steps of:
    implementing measurements in said formations using electromagnetic energy at a plurality of at least three frequencies;
    deriving, from said measurements, a respective plurality of formation permittivities and a respective plurality of formation conductivities;
    determining, using said plurality of formation permittivities and formation conductivities, the cementation and the saturation exponent of said formations and;
    recording the determined cementation and saturation exponent of said formations.

2. The method comprising repeating said steps of claim 1 at different depth levels and producing a log of determined and recorded cementation and saturation exponent of said earth formations.

3. The method as defined by claim 1, wherein at least some of said measurements of electromagnetic energy in said formations are taken at different depths of investigation.

4. The method as defined by claim 1, wherein at least some of said measurements of electromagnetic energy in said formations are taken at different depths of investigation, and wherein said step of determining the cementation and the saturation exponent of said formations comprises determining a radial profile of at least one of said cementation and said saturation exponent.

5. The method as defined by claim 1, wherein at least some of said measurements of electromagnetic energy in said formations are taken at different polarizations, and wherein said step of determining the cementation and the saturation exponent of said formations comprises determining a radial profile of at least one of said cementation and said saturation exponent.

6. The method as defined by claim 1, wherein said plurality of frequencies are in the range about 100 MHz to 1 GHz.

7. A method for determining and recording the cementation and the saturation exponent of earth formations surrounding a borehole, comprising the steps of:
    implementing measurements in said formations using electromagnetic energy at a plurality of frequencies;
    deriving, from said measurements, a respective plurality of formation permittivities and a respective plurality of formation conductivities;
    determining, using said plurality of formation permittivities and formation conductivities, the formation water saturation and the formation DC resistivity;
    selecting a further water saturation and deriving a corresponding further DC resistivity;
    determining said cementation and said saturation exponent using said formation water saturation, said further water saturation, said formation DC resistivity, and said further DC resistivity; and
    recording the determined cementation and saturation exponent of said formations.

8. The method as defined by claim 7, wherein said plurality of frequencies comprises at least three frequencies.

9. The method as defined by claim 8, further comprising the steps of deriving the permittivities of the formation matrix and hydrocarbons, and the formation water salinity, and using said derived permittivities of the formation matrix and hydrocarbons and said derived water salinity in said steps of determining said formation water saturation and formation DC resistivity and said further DC resistivity.

10. The method as defined by claim 9, further comprising the step of deriving aspect ratios associated with the formation matrix, and using said aspect ratios in determining said formation water saturation and formation DC resistivity and said further DC resistivity.

11. The method as defined by claim 10, wherein said step of determining, using said plurality of formation permittivities and formation conductivities, the formation water saturation and the formation DC resistivity, includes the following steps:
    inverting, using a dispersion model and said plurality of formation permittivities and formation conductivities, to obtain said formation water saturation;
    deriving, using said plurality of formation permittivities and formation conductivities, and said obtained formation water saturation, a formation conductivity dispersion curve; and
    determining, from said formation conductivity dispersion curve, the formation DC resistivity.

12. The method as defined by claim 11, wherein said step of inverting, using a dispersion model and said plurality of formation permittivities and formation conductivities, is operative to further obtain rock texture parameters of the formation matrix.

13. The method as defined by claim 7, wherein said step of determining, using said plurality of formation permittivities and formation conductivities, the formation water saturation and the formation DC resistivity, includes the following steps:
    inverting, using a dispersion model and said plurality of formation permittivities and formation conductivities, to obtain said formation water saturation;
    deriving, using said plurality of formation permittivities and formation conductivities, and said obtained formation water saturation, a formation conductivity dispersion curve; and determining, from said formation conductivity dispersion curve, the formation DC resistivity.

14. The method as defined by claim 13, wherein said step of inverting, using a dispersion model and said plurality of formation permittivities and formation conductivities, is operative to further obtain the salinity of the formation water and the permittivity of the formation matrix.

15. The method as defined by claim 14, wherein said step of inverting, using a dispersion model and said plurality of formation permittivities and formation conductivities, is operative to further obtain rock texture parameters of the formation matrix.

16. The method as defined by claim 15, wherein said rock texture parameters comprise aspect ratios of rock grains of the formation matrix.

17. The method as defined by claim 15, wherein said rock texture parameters comprise spherical grains and ellipsoidal micropores of the formation matrix.

18. The method as defined by claim 15, wherein said rock texture parameters comprise aspect ratios of macropores, grains, and hydrocarbons.

19. The method as defined by claim 13, wherein at least some of said measurements of electromagnetic energy in said formations are taken at different depths of investigation, and wherein said step of inverting to obtain said formation water saturation comprises inverting to obtain a radial profile of formation water saturation.

20. The method as defined by claim 13, wherein at least some of said measurements of electromagnetic energy in said formations are taken at different depths of investigation, and wherein said step of inverting to obtain said formation water salinity comprises inverting to obtain a radial profile of formation water salinity.

21. The method as defined by claim 13, wherein at least some of said measurements of electromagnetic energy in said formations are taken at different polarizations, and wherein said step of inverting to obtain said formation water saturation comprises inverting to obtain a radial profile of formation water saturation.

22. The method as defined by claim 13, wherein at least some of said measurements of electromagnetic energy in said formations are taken at different polarizations, and wherein said step of inverting to obtain said formation water salinity comprises inverting to obtain a radial profile of formation water salinity.

23. A method for determining and recording a radial profile of permittivity and/or conductivity of anisotropic earth formations surrounding a borehole, comprising the steps of:
 implementing measurements in said formations of electromagnetic energy, at a plurality of frequencies, and at different depths of investigation;
 deriving, from said measurements of electromagnetic energy, at said plurality of frequencies, and at said different depths of investigation, a respective plurality of formation permittivities and a respective plurality of formation conductivities;
 determining, using said respective plurality of formation permittivities and said respective plurality of formation conductivities, a radial profile of vertical and horizontal permittivity and/or a radial profile of vertical and horizontal conductivity; and
 recording said radial profile of vertical and horizontal permittivity and/or said radial profile of vertical and horizontal conductivity.

24. A method for determining and recoding a radial profile of permittivity and/or conductivity of anisotropic earth formations surrounding a borehole, comprising the steps of:
 implementing measurements in said formations of electromagnetic energy, at a plurality of frequencies, and at different polarizations;
 deriving, from said measurements of electromagnetic energy, at said plurality of frequencies, and at said different polarizations, a respective plurality of formation permittivities and a respective plurality of formation conductivities;
 determining, using said respective plurality of formation permittivities and said respective plurality of formation conductivities, a radial profile of vertical and horizontal permittivity and/or a radial profile of vertical and horizontal conductivity; and
 recording said radial profile of vertical and horizontal permittivity and/or said radial profile of vertical and horizontal conductivity.

25. A method for determining and recording effective permittivity of earth formations surrounding a borehole, comprising the steps of:
 deriving a mixing law permittivity as volumetric fractions of formation matrix, water, and hydrocarbon permittivities;
 deriving an effective permittivity model as a function of mixing law permittivity and rock texture parameters;
 implementing measurements in said formations using electromagnetic energy at a plurality of at least three frequencies;
 deriving, from said measurements, a respective plurality of formation permittivities and a respective plurality of formation conductivities;
 determining effective permittivity of said formations using said model and said derived plurality of formation permittivities and formation conductivities; and
 recording said effective permittivity of said formations.

26. The method as defined by claim 25, wherein said rock texture parameters comprise aspect ratios of rock grains of the formation matrix.

27. The method as defined by claim 25, wherein said rock texture parameters comprise spherical grains and ellipsoidal micropores of the formation matrix.

28. The method as defined by claim 25, wherein said rock texture parameters comprise aspect ratios of macropores, grains, and hydrocarbons.

29. A method for determining and recording rock type of earth formations surrounding a borehole, comprising the steps of:
 deriving a mixing law permittivity as volumetric fractions of formation matrix, water, and hydrocarbon permittivities;
 deriving an effective permittivity model as a function of mixing law permittivity and rock texture parameters;
 implementing measurements in said formations using electromagnetic energy at a plurality of at least three frequencies;
 deriving, from said measurements, a respective plurality of formation permittivities and a respective plurality of formation conductivities; and
 determining rock type of said formations using said model, said derived plurality of formation permittivities and said derived plurality of formation conductivities; and
 recording said determined rock type.

30. The method comprising repeating the steps of claim 29 at different depth levels and producing a log of the determined and recorded rock type.

* * * * *